COMPUTATION WITH VARIABLE FRACTIONAL POINT READOUT
Filed Sept. 24, 1965
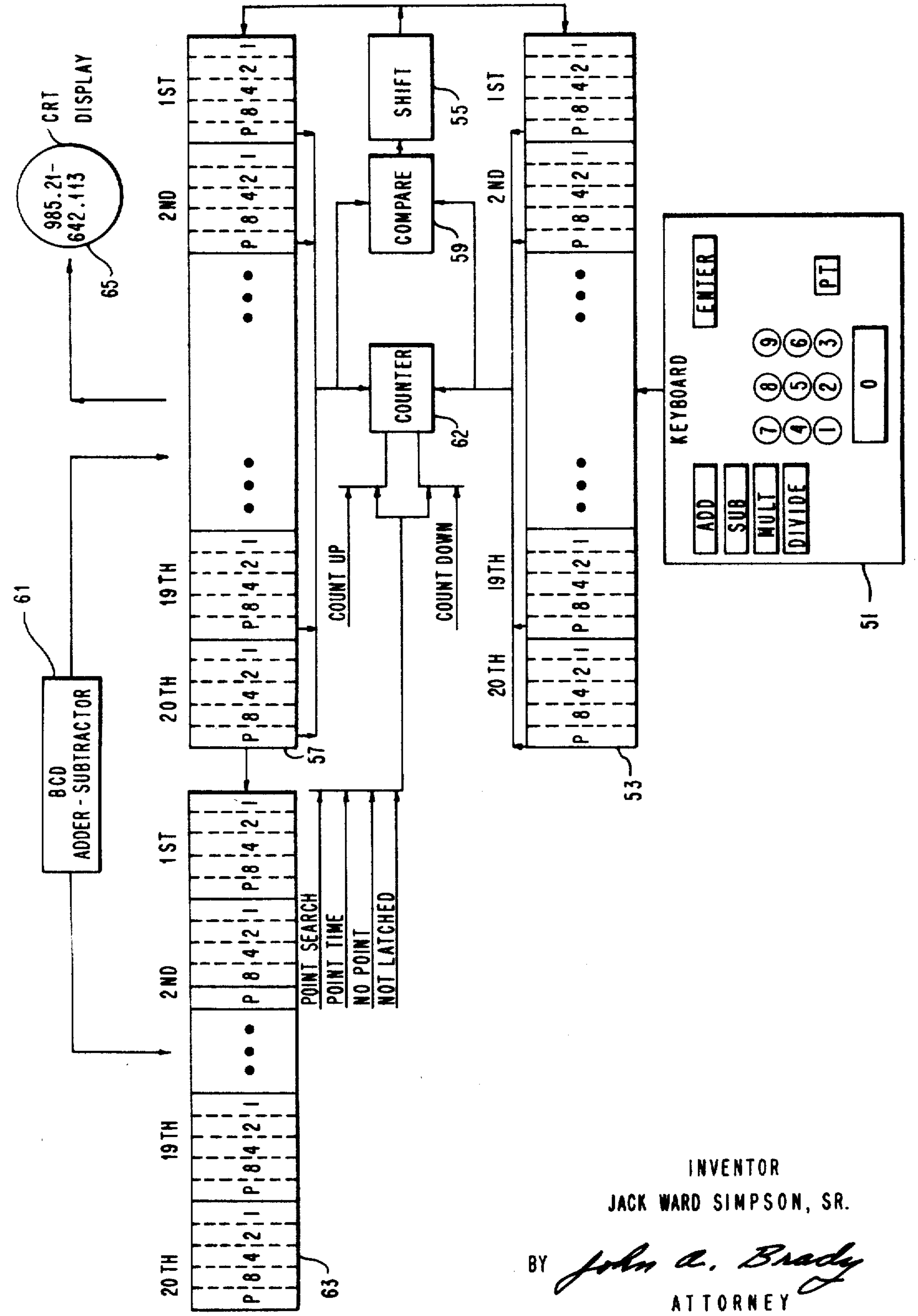
INVENTOR
JACK WARD SIMPSON, SR.
BY John A. Brady
ATTORNEY

United States Patent Office 3,391,391
Patented July 2, 1968

3,391,391

COMPUTATION WITH VARIABLE FRACTIONAL POINT READOUT

Jack Ward Simpson, Sr., Lexington, Ky., assignor to International Business Machines Corporation, Armonk, N.Y., a corporation of New York Filed Sept. 24, 1965, Ser. No. 489,877
15 Claims. (Cl. 340—172.5)

ABSTRACT OF THE DISCLOSURE

An electronic calculating machine having a result register adapted to store numerical information in a plurality of ordered stages and also adapted to store the fractional point indication in any of the selected ordered stages. Means are provided to perform the arithmetic operations of multiplication, division, addition, and subtraction of two stored numbers and to store the resultant number in the result register. Additional means are provided to access the stored numbers, compute the proper fractional point location of the resultant number in accordance with the arithmetic operation performed and to store this fractional point location in its proper relative position in the result register. Display means read the result register and display the result in a preselected order. The fractional point is thus automatically displayed in the order read and in its proper relationship to the digits read.

This invention relates to computation and display in which a decimal point, binary point, or similar fractional point can be computed and read out with optimum efficiency. The invention is particularly suited for use with a desk calculator or similar device featuring high speed computation and variable display suited to the particular computation.

Electronic data processing has increased in quality and practicality in the prior art such that the arithmetic functions of addition, subtraction, multiplication, and division are available in suitable forms to machine designers. These basic tools, however, have not been sufficient to provide a calculating capability of good versatility and acceptable cost and size when the machine is to be used for computations with numbers entered by hand at frequent intervals by the machine operator.

Thus, versatility is known in the prior art only in machines of undesirably high cost or size. In particular, satisfactorily low cost machines are needed which provide the basic computations in response to numbers keyed in or otherwise entered into the machine and also permit fractional point location to be readily selected. It is also of manifest value in a desk calculator or similar computing device to have provision to readily compute and display the position of a decimal point or similar fractional point and a conveniently selected number of significant digits following the fractional point.

It is known in the prior art that the decimal or fractional point location can be processed as a value separate from the numeric values of the number. The prior art knows that in addition or substraction the decimal or fractional point of both numbers must be referred to prior to the arithmetic steps so that the values occurring in each ordinal of a first number can be added or subtracted from the value occurring in the proper ordinal of the second number. Furthermore, the prior art is aware that multiplication and division can be conducted without direct reference to the decimal or fractional point and that the fractional and decimal point can be inserted in the result independently, by shifting the point forward or backward as required.

This invention aligns the fractional points of two numbers prior to addition and subtraction. During multiplication and division, this invention processes the fractional point independently. In these respects, therefore, this invention is similar to the prior art. Significant efficiencies are realized over the prior art, however, in that the circuit arrangements for versatile handling of the fractional point are provided. In machine computations in accordance with this invention, the fractional point is processed and stored in the register for display using a system in which the arithmetic functions are unimpeded. In addition and subtraction only shifting means are basically required to achieve the versatility. In multiplication and division the addition is required of only counting means and a few incidental circuits.

The primary object of this invention is to optimize the design of electronic data processing machines to thereby achieve versatility in fractional point processing and display and to permit the significance of results below the fractional point to be readily selected by the machine operator.

It is a more specific object of this invention to achieve significant economies in the design of a small or desk type calculator.

In accordance with this invention a result register is provided which is adapted to store the fractional point indication as well as digital information. Means are provided to compute the proper fractional point location as a part of any arithmetic operation and to store this fractional point location in the proper place in the register. Display means read the result register and display the results in a preselected or invariable order or pattern. In this manner the fractional point is automatically displayed in the order read and in a relationship to digits read which is controlled by the location of the fractional point in the result register.

In accordance with more specific aspects of this invention, one number to be added or subtracted is originally stored in the result register. A second operand is stored in another register. The fractional points locations in the two numbers are compared, and at least one of the two numbers is shifted in its register until the fractional point in the result register is positioned at a location which reflects the fractional point location in the number which will be generated by the adding or subtracting means provided. The numbers are then added or subtracted without regard to the fractional point and the display means then sequentially reads all stages of the result register in order to automatically display the fractional point in the proper location.

Also in accordance with other more specific aspects of this invention, two numbers to be multiplied or divided are stored in two memory registers of the machine with their fractional points also so stored. One of the registers is then accessed serially and a count is made of the number of ordinals to the fractional point. The count is resumed as the second register is then accessed serially. The count is continued in the same direction for multiplication and in the opposite direction for division. The result register is then accessed. (Preferably, the result register is one of the registers holding the two numbers.) During this last access cycle any prior fractional point indication in the register may be removed and a fractional point indication is inserted in the storage location corresponding to the total in the counter. Computations proceed independently of any fractional point, but during display of the result the fractional point in the result register is accessed and displayed automatically along with the rest of the contents of the result register.

The foregoing and other objects, features and advantages of the invention will be apparent from the following more particular description of a preferred embodiment of the invention, as illustrated in the accompanying drawings.

FIG. 1 shows a preferred system for a desk calculator.

*The system*

The preferred embodiment is a desk calculator. It is to be used by individuals to solve arithmetic computations on the basis of numbers keyed into the machine along with a few simple operation directions keyed into the machine. The primary function of the machine is to add, subtract, multiply, and divide. The machine has several registers in which a particular factor, such as the value of pi (3.1416 . . .) or some other operand previously keyed into the machine can be inserted for repeated use in the machine as needed. In accordance with this invention a single total or result register is provided, a single entered factor or input register is provided, and a single multiply-divide register is provided. Information in all of the registers of the desk calculator can be recalled for repeated use in data processing.

The machine, except for its keyboard, is entirely electronic to thereby provide the high speed capabilities reasonably available only through the use of electronics. Since input in the decimal notation is desirable, and display of decimal results is desirable, the structural expense and time consumed for a conversion from decimal to natural binary notation and then back to decimal notation for display is avoided by providing a system which operates entirely in the well known binary coded decimal notation. Arithmetic computations by machine in binary coded decimal notation are somewhat slower than computation in natural binary notation, but it is believed that this difference is negligible to the requirements of a desk calculator.

The desk calculator has toroidal magnetic core memory and solid state circuit elements and logic. An eleven key keyboard is used for number entry. Electronic arithmetic means are provided which, basically, are capable of adding and subtracting binary coded decimal numbers. Multiplication and division are accomplished by arrangements basically using addition, subtraction and shifting. Display is by electronic beam tracing on the screen of a cathode ray tube, the result and other registers being accessed serially at electronic speeds and converted by suitable electronics to control the tracing of a pattern by the electronic beam of the tube. Access of the registers is repetitive, but so rapid that the numbers displayed on the face of the cathode ray tube appear constant.

In such a system it was found economic in structure to multiply and divide by using addition and subtraction. In multiplication, one factor is added a number of times equal to the value of one ordinal of a second factor; both the partial product obtained and the second factor are then shifted; and then the addition process as desribed is repeated. In dividing, the divisor is suubtracted repeatedly from proper ordinals of the dividend; the number of successful subtractions occurring prior to a negative difference is recognized as one ordinal of the quotient; the partial quotient and the remainder from the subtraction are shifted; and then the subtraction process as described is repeated. These systems of multiplication and division are used in this desk calculator, and the economies obtained are enhanced by the decimal point processing method used.

*Versatility provided*

The machine as so far described will provide the basic desk calculating functions at electronic speeds and can be constructed in various circuit forms at the design choice of those skilled in the art. In accordance with the invention, however, economical and practical means are provided to permit the results of arithmetic performed to vary in decimal point location and to permit the significance in values below the decimal point to be varied within wide limits. Furthermore, this is achieved by the manual operation of only ten numeric keys and one decimal point key, and all of the results of addition, subtraction, multiplication, and division are displayed using the same structures.

In addition, subtraction, and multiplication the operator need not even refer to decimal points but need only key the decimal point in at the location in which it appears in each number. In division, as will be further clarified, the number of extra zeros keyed in as values below the decimal point in the dividend automatically and without further operator control provides for a quotient having significance below the decimal point increased in number of ordinals by the number of such zeros keyed in.

For example, to multiply 12.1×14, the machine operator depresses the "1" key, then the "2" key, then the "point" key, and then the "1" key again. The operator then presses an "Enter" operation key which signifies that entry is complete. The machine operator then depresses the "1" key and then the "4" key. The operator then depresses the "Multiply" operation key. Multiplication takes place immediately at electronic speeds. The number 169.4 is quickly displayed on the screen of the cathode ray tube.

To divide 9.56 by 1.3, the machine operator may wish to insert zeros after the 6 in order to increase the significant figures of his answer. If no increase in low order significance of the quotient is desired, the operator would press the "9" key, then the "Point" key, then the "5" key, then the "6" key and then the "Enter" key. The machine operator would then depress the "1" key, then the "Point" key, then the "3" key, and then the "Divide" key. Division takes place immediately at eletronic speeds, and the number 7.3 is displayed on the screen of the cathode ray tube.

The machine operator could have elected, however, to have two more ordinals in his quotient. To achieve this he need only key in that many zeros at the end of the dividend. Thus, he would depress the "9" key, then the "Point" key, then the "5" key, then the "6" key, then the "0" key then the "0" key again, and then the "Enter" key. The rest of the operation is as before, and the number 7.353 is quickly displayed on the screen.

*Decimal point circuits*

Machines operating in serial fashion are economic. Therefore, this entire machine operates serially by bit and serially by character since such operation is the most economical in structure and the inherent slower operation is not a substantial detriment in a desk calculator. Each register has magnetic toroidal core memory elements in twenty stages to store twenty characters, each of which contains four individual toroidal cores to provide four bit storage locations for storing individual bits in binary coded decimal coding and one individual toroidal core to provide one bit storage location for indicating the existence of a decimal point.

When a number key is depressed at keyboard 51, electronic latches are closed and the code combination for that number is read serially into the lowest order (1st) stage of Input Register 53. Depression of a second number key initiates shift logic 55, which is simply a read-write sequence control operative in this case on Input Register 53. The read-write sequence control operates by reading information out of the lowest order (1st) stage. Then the binary coded decimal information from the key depressed at the keyboard is then read into the 1st stage. Then information is read out of the 2nd stage and the information previously read out of the 1st stage is written into the 2nd stage. This sequence continues until the 20th stage is written into with information previously in the 19th stage. Thus, as various keys are depressed at the keyboard, the code for the first key depressed is progressed to higher stages in Input Register 53 and the numbers subsequently depressed are stored in proper sequence in the next-following lower stages of register 53.

The above described operations are variable only in one instance: the depression of the "Point" key. At the depression of the "Point" key no signal is connected to shift circuit 55 and, therefore, no shift occurs. A bit indication is immediately written into the 5th bit location of the 1st stage of Input Register 53. Depression of the next numerical key initiates a shift as described above.

When the first number, which may be a multiplicand, or a factor for addition or subtraction, or a dividend has been keyed in (for division, as discussed, a selected number of zeros is keyed in after the last ordinal of a dividend having a value of 1 or more), the "Enter" key is depressed. The "Enter" key initiates a read-write transfer operation between all of the corresponding stages of Input Register 53 and Total Register 57. To simplify squaring and similar mathematical operations, the data in Input Register 53 is also reinserted in its original form back into register 53. Thus, the first bit is read from the 1st stage of register 53, is rewritten into the original location in register 53, and is then written into the first bit position of the 1st stage of register 57. The second bit in the 1st stage of register 53 is then transferred into the second bit location in the first stage of register 57, and is rewritten into register 53. This continues in sequence until the last bit in the 20th stage is transferred to the last bit location in Result Register 57 and repeated in the last bit in the 20th stage of register 53.

Input Register 53 is cleared to receive a second number as an automatic part of the entry operation of the second number. Means are provided responsive to the first digit or decimal point keyed in to simply clear the entire contents of Input Register 53 prior to entering the highest ordinal of the second number in the manner above described in connection with entry of the first number. The rest of the second number, which may be a multiplier, or divisor, or a factor for addition or subtraction, is also keyed into Input Register 53, with the structures responding in exactly the manner as described when the first number was entered.

If a decimal point has not been keyed in when one of the function keys such as the Enter Key is depressed, the machine is structured to automatically enter a point indication in the 1st stage of register 53. This assures that some decimal point indication exists for use in the decimal point processing invention as described in detail below.

*Add-subtract*

After entering the second number, the "Add" or "Subtract" operation key may be the one depressed by the individual operating the machine. assuming, of course, that it corresponds to the operation which he desires. In an Add or Subtract operation, the number having its decimal point furthest towards the low order is shifted left or toward the higher valued ordinals until that decimal point appears in the same stage as the stage in which the decimal point of the other number appears. This also is performed in serial fashion with individual stages of registers 53 and 57 first being accessed alternately and compared in compare circuit 59 to determine in which register the decimal point first appears. Compare circuit 59 then controls shift circuit 55 in a manner such that the register 53 or 57 in which the decimal point is in the lowest ordinal is shifted up one stage with zero bits being inserted in the first stage to indicate both zero numerical value and no decimal point. Shifting is by read-write sequence as described above for the shifting of register 53. Cycles of one comparison and one shift are continued until the comparison shows the decimal point to be in the same stage in both Input Register 53 and Total Register 57. The numerical contents of the two registers are then processed through Adder-Subtractor 61, serially lower order stage first. During arithmetic, the structures simply leave the decimal point indication essentially undisturbed. The results are stored as they are generated in the stage of Total Register 57 which was accessed into Adder-Substractor 61. Thus, the previous operand in Total Register 57 is destroyed as it is read out of Total Register 57 and the result is sequentially stored in that register.

In summary, therefore, when the first or lowest ordinal stage of the numbers are added or substracted, the result is stored in the 1st stage of Total Register 57. Further stages of the numbers are processed in the same manner. During all arithmetic operations the values read from Input Register 53 are rewritten immediately back in the same bit location from which they were read. An important provision in the structure is that the decimal point bits are left essentially undisturbed during arithmetic operations. The decimal point indication, therefore, remains located in Total Register 57, where it can be read out for display in the proper relationship to the sum or difference generated. During read out for display a decimal point indication in one stage of register 57 is automatically displayed below the number described by the conditions in that stage. This sequence of display, of course, maintains the position relationship established when keyed in numbers were written into the registers. Read out and display is in accordance with an invariable sequence in which the stages of Total Register 57 are accessed in numerical, sequential order and displayed in the order accessed. Thus, the decimal point will be automatically accessed in its proper place in the result and therefore will be automatically displayed in its proper place. The stages of information accessed are converted in form by suitable circuitry so that the ordinary, visual representations of the numbers appear on the screen of cathode ray tube display 65. Access to register 57 is repetitive and at such high speeds that the visual display appears constant.

*Multiply*

After the machine operator enters the second number, the "Multiply" operation key will be depressed by the operator if he desires a multiply operation to occur. This initiates an additive count by counter 62 of low order stages below the two decimal points of the two numbers.

Input Register 53 is first scanned in sequence, beginning with the 1st stage. The fifth bit location in each stage is the one which carries a decimal point indication. Thus, each fifth time is the time at which a decimal point will or will not be found. If no decimal point indication occurs at this time, counter 62 is advanced one step. When a decimal point indication is found in one of the stages of register 53, a latching circuit or bistable trigger (not shown) is activated. As illustrated by the logic shown in FIG. 1, counter 62 will not receive an activating pulse when the latch signal is up. Counter 62 is, therefore, inhibited by the latched input and will cease to count for the remainder of the scan of the register. Thus, at the end of the scan of register 53, the counter 62 stands containing the total of the number of stages of the number in register 53 which are below the decimal point (fractional in ordinal value).

After Input Register 53 is scanned, the scanning of Total Register 57 automatically follows, beginning with the 1st stage. The latched input is deactivated at the end of the scan of register 53; therefore, the scan of register 57 advances the counter in the same way as described for register 53. When a decimal point indication is found in one stage of register 57, the latch is again activated and no further count is made.

Thus, at the end of the access cycles of both Input Register 53 and Total Register 57, counter 62 stands with a number representing the total digits keyed in below both decimal points. At this time a new access cycle through register 57 begins. Only the decimal point bits are permanently disturbed. Counter 62 is counted down one with each stage of register 57 accessed. Any bit representing a decimal point found is erased, and a bit indicating the existance of a decimal point is written in at the stage accessed at the time at which counter 62 first stands at zero.

The remaining cycles are also automatic after the depression of the "Multiply" operation key. In the remaining cycles it is the absolute value of the number which is operated upon while the decimal point is not permanently disturbed. The numerical contents of the Total Register 57 are transferred completely into Multiply-Divide Register 63; that is, the numerical contents of the 20th stage of register 57 are transferred into the 20th tage of register 63 and the numerical contents of the lower stages are transferred in the same fashion and in the same relationship of stages. The decimal point indication remains in register 57, and it will be in the proper position relative to the product of multiplication which will be generated around it. Except for the decimal point, register 57 is cleared of data by the transfer operation.

Multiplication is accomplished by adding the contents of Input Register 53 into Total Register 57 a number of times and in a relatively shifted position as dictated by the value found in each ordinal of Multiply-Divide Register 63. Multiplication in this manner begins with the 20th stage of register 63. In accordance with this multiplication system, the contents of Input Register 53 are first added as part of the product a number of times identical to the number found in the 20th stage of a register 63 and subsequently shifted left. Thus, if a "2," for example, appears in the 20th stage of Multlipy-Divide Register 63, the number in register 53 is added twice; subsequent shifts will transfer the first sum generated 19 ordinal positions toward the high orders.

The number in register 53, might for example, be "4." The number is read into adder-subtractor 61 and inserted by added-subtractor 61 into Total Register 57. The 1st stage of register 53 is treated as comparable to the 1st stage of register 57, and the higher stages are likewise treated as comparable in the numerical order.

Thus, assuming a "2" in the 20th stage of Multiply-Divide Register 63, the number from register 57 is read into adder-subtractor 61 and added to the contents (zero in this initial operation, of course) of Total Register 57. The sum generated is inserted into the stages of register 57, beginning with the 1st stage. Since a "2" is assumed to be in the 20th stage of Multiply-Divide Register 63, two additions of the number into the contents of register 57 are required. The number in register 53, is, therefore, read again into adder 61, and the 1st stage of that number is added to the contents of register 57, with that 1st stage being considered comparable in ordinal value to the 1st stage at register 57. The contents of Total Register 57 and Multiply-Divide Register 63 are then shifted one stage, and the just described process of addition into the register 57 based upon the contents of the 20th stage of register 63 is repeated.

It will be evident that the machine operator must be aware of a restriction in the system imposed by the limited number of stages in Total Register 57. The first addition as described will be conducted, followed by nineteen shifts and additions as described. In multiplication the restriction is simply this: the two numbers to be multiplied cannot produce a product having more than 20 significant ordinals in absolute value. If this restriction is violated by the machine operator when he keys in the numbers, the structures provided are simply not large enough to accept and properly process the result generated. In the assumed example above, the restriction was not necessarily violated because, even though a "2" appeared in the 20th stage of one number, the other number was only 4 in total value. Thus, the largest significant ordinal of the product has a value of 8, which appears in the 20th stage, but not in higher stages. Had the other number been 5, the restriction would have been violated.

The above example of multiplication of the absolute value of two numbers will now be continued. With the two additions called for by the value of the 20th stage of register 63 complete, the contents of both registers 63 and 57 are shifted one stage toward the high orders. A next lower ordinal then appears in the 20th stage of register 63. This could be, for example, a "3." Three additions of the contents of register 53 are, therefore, required. This is structurally implemented by reading the 1st stage of register 57 (which is zero because of the shift) into adder 61 to be added to the contents of the 1st stage of register 53 and, of course, continuing this relationship by reading the 2nd stage of register 57 (which is 8 because of the previous operations) for addition with the second stage of register 53, and similarly with higher stages to the extent to which the machines can process higher stages. Since a "3" was in the 19th stage of register 63, this addition is made three times, with each result being stored in Total Register 57. The addition is entirely conventional and carries produced are therefore transferred up as usual.

As will be clearly understood in view of the above, this pattern is repeated for the twenty stages originally in register 63 and the final sum in register 57 represents the multiplication of the original contents of registers 63 and 53 with the 1st stage of register 57 containing the lowest ordinal stage of the product obtained. It will be recognized that the addition and shifting as above described invariably produces a true product for a multiplication of any two numbers. Although for purposes of simplification the number in Input Register 53 was assumed to be four in total value, it will be recognized that larger numbers can be processed by the same pattern. Thus, the next higher ordinals of such larger numbers are added into the next higher stages of register 57 strictly in the order in which they appear. Purely as an example, the number "24" might be in register 53. A "3" might occur initially in the 12th stage of register 63. After eight additions and shifts as described, the "3" would be in the 20th stage of register 63. Thus, the number 4 would be inserted into the 1st stage of register 57 and the number "2" would be added into the contents of the 2nd stage of register 57 along with any carries from the lower orders. Because, a "3" exists in the pertinent stage of register 63, the "24" is added three times, all the while, of course, the contents of register 57 increases. In every case the previously generated sums have been shifted once after the additions called for by the contents of the 20th stage of register 63. In every case the addition and shifting are further continued until the additions are complete for the digit which was originally in the lowest stage of register 63. Twenty addition steps and nineteen shift steps are conducted. The multiplication is then complete, and the decimal point is invariably in the proper place in Total Register 57.

Although various means of properly and automatically terminating the multiplication operation are ready available, it is preferred to insert a special code in the 1st stage of Multiply-Divide Register 63 at the first shift. When this special code reaches the 19th stage of register 63, it is automatically recognized as a signal to terminate the multiplication operation after the contents of the 20th stage of register 63 have been utilized in the multiplication.

It is an important feature of this invention, of course, that in the accessing of the Total Register 57 to the display 65, the entire contents of register 57, including the decimal point indication, is read in a pre-determined sequence. Since the decimal point was stored previously in accordance with a count of total ordinals below the decimal point, the decimal point appears in the display in its proper location without further complication or expense in the structures involved and without any requirement or delay imposed by a scheme which would cause the machine operator to perform the same step at the time of the display. Read out and display is entirely as this is described above in connection with addition and subtraction. The same structures are used.

*Divide*

After the machine operator enters the second number, the "Divide" operation key will be depressed by the operator if he desires division to occur. This initiates a subtractive count of low order stages below the two decimal point of the two numbers.

Input Register 53 is first scanned in sequence, beginning with the 1st stage. The fifth bit location in each stage is the one which carries a decimal point indication. During a divide operation the number in register 53 is the divisor, and the effect of numbers below the decimal point in accordance with this invention is to require a reduction in the number of ordinals below the decimal point. As in multiplication, a count in counter 62 is made of each indication of no decimal point in each stage of register 53 as it is read. However, the count is down during this operation. When a decimal point indication is found in one of the stages of register 53, the latching circuit is activated and further counting is inhibited as described in the multiply operation.

The remaining placement of the decimal point is virtually identical to that described for multiplication. Register 57 is scanned beginning with the 1st stage and counter 62 is counted up one for each low order stage not containing a decimal point. At the end of the access cycles, counter 62 contains the decimal point location of the result. As described for multiplication, a bit indication for a decimal point at this location is then inserted in Total Register 57 and any previous decimal point indication in register 57 is erased. The division algorithm on the absolute values of the two factors automatically begins. The decimal point indications are not permanently disturbed until after read-out for display.

The actual division algorithm is analogous to pencil and paper division. The number in Total Register 57 is shifted one stage to the left so that when the value previously in stage 20 of register 57 is then in the 1st stage of Multiply-Divide Register 63. The value in Multiply-Divide Register 63 is then read to Adder-Subtractor 61 along with the value in Input Register 53, and the value from register 53 is subtracted from the value in register 63, the 1st stages of each being considered to have the same ordinal value, and the higher stages being considered in sequence and as comparable in ordinal value in the same manner.

As mentioned, the entire machine is serial in operation. Therefore, any difference obtained by a single subtraction must be inserted in a register. In the case of division, a difference obtained is an important part of the result obtained and is inserted in Total Register 57. The subtractions are repeated and counted until it is noted that a value greater than that in register 63 has been subtracted from register 63.

A subtraction of a number in register 53 which is greater than the number presently stored in register 63 produces a condition in subtractor 61 based essentially upon the usual highest order borrow condition which occurs when mechanical subtractors produce a negative difference. This borrow is the signal that subtractions have been one too many. Each subtration prior to this produced a condition in subtractor 61 which is opposite to the usual high order borrow condition. Although other methods of accumulating the number of successful subtractions are entirely within the scope of this invention, applicant simply advances the contents of the 1st stage of register 57 with a signal indicative of "1" in value each time an indication from subtractor 61 is noted as will be immediately described.

Adder-subtractor 61 subtracts by using a 15's complement in a manner well known. A useful reversal therefore occurs because a high order borrow appears with each subtraction until the difference enters the negative region. This high order borrow is simply interpreted as a "1" in value, and it is added each time by adder 61 to the contents of the 1st stage of Total Register 57. The number of subtractions prior to the difference becoming negative are thus accumulated, and this accumulated result is stored in the 1st stage of Total Register 57.

When the difference becomes negative, the value in Multiply-Divide Register 63 is modified by one addition cycle. In this cycle the contents of register 53 are added to the contents of register 63. In this manner the number in register 63 is brought to the value which represents the remainder after the number of subtractions which can be successfully made in the original number in register 63 before entering the region of negative numbers.

After completion of the accumulation of the number of successful subtractions into the 1st stage of Total Register 57, a one stage shift is conducted by both registers 63 and 57 so that the remainder previously generated in register 63 is advanced one stage and so that the then value in the 20th stage of register 57 is advanced to the first stage of register 63. Shifting is simply by read-write sequence as previously described. The decimal point indication is, of course, not shifted or otherwise disturbed.

Further division is by a repetition of the above described cycles until all twenty stages of Total Register 57 have been shifted into register 63 and the subtractions and accumulation of total subtractions written into the first stage of register 57 is finished.

A more detailed example of the division may be helpful. It will be assumed that the dividend is 197 and that the divisor is 5. Therefore, Result Register 57 contains the following: 0 0 0 0 0 0 0 0 0 0 0 0 0 0 0 0 0 1 9 7, with the "7" in the first stage and the other stages as shown. Input Register 53 contains the following: 0 0 0 0 0 0 0 0 0 0 0 0 0 0 0 0 0 0 0 5, with the "5" in the first stage.

In a division operation the left hand zero in register 57 is first read into register 63 and a subtraction to reach a positive result of this value (0) from the value in the Input Register (5) is attempted. Since the result obtained is negative, the subtractor 61 does not produce a signal causing a 1 to be accumulated. A "0" is written into the first stage of register 57, and the shift of one stage is conducted in registers 63 and 57, with the high order stage of register 57 being shifted into the low order stage of register 63.

Clearly in this example the above will occur identically seventeen times, since the first seventeen stages of register 57 originally contained "0." When the eighteenth shift is made a "1" exists in the first stage of register 63. However, the "5" in the Input Register does not subtract from "1" to yield a positive result, so a zero is written into the first stage of register 57 for the eighteenth time.

The shift is again conducted. Since the "1" in register 63 was not effectively subtracted from, and since the "9" is shifted from register 57, the value "19" then appears in register 63. This time the value "5" is effectively subtracted three times. An effective count of "3" is accumulated in the 1st stage of register 57. The value "4" was the remainder resulting from the three subtractions of "5" from "19," so a "4" appears in register 63.

The final shift is then conducted. Since a "7" is moved from Register 57, the value in register 36 becomes "47." Nine successful subtractions occur, and these counts are accumulated one at a time into the 1st stage of register 57. The 1st stage of register 63 therefore stands containing a value of "9." The division is complete, and the twenty stages of the quotient are in the twenty stages of Total Register 57. At this time the value is automatically displayed using the same structures and in the manner more fully discussed above with reference to the other arithmetic operations. Any decimal point is automatically read from register 57 and displayed, of course, and, as discussed, the decimal point automatically is in the correct position.

Should more low order significance in the result of the above example of divisions of "197" by "5" be desired, this is obtained simply by keying in low order zeros after the decimal point. For example, had the "197" been keyed in as follows, eighteen significant figures would have appeared in the result: 0 1 9 7 0 0 0 0 0

0 0 0 0 0 0 0 0 0 0 0 0. To achieve the proper decimal point in the display, the only thing the operator need do is to key the decimal point after the seven and before keying the first of the series of zeros. As discussed, the processing and display of the decimal point is then fully automatic. The subtractive count of point locations relates the ordinal values involved and thereby invariably properly describes the decimal point location in the quotient.

Although it is not essential, a restriction is placed upon the machine operator also in the case of division. This restriction is simply that the first stage generated of the quotient must have a significance of zero. By placing this restriction, the first ordinal of the quotient generated becomes invariably available for use in machine design. Thus, a special code not having significance to the display means is inserted in the 1st stage of register 57 during the first subtraction cycle as an automatic part of the operation described. The machine will recognize the special code when it appears in the 20th stage of register 57 to automatically terminate the division operation. During display, of course, the special code will be of a kind which will automatically not be displayed.

*Capitulation*

Although an implementation of this invention employing electronic data processing techniques is definitely contemplated, it is recognized that the basic tools of electronic data processing have become so large in number that the implementation of this invention may take a multitude of forms.

Applicant uses, and believes it is definitely preferable to use, logical circuits to define different storage locations and clock times. Thus, a single free running oscillator is used in the circuit. The trailing edge of the pulses from this oscillator is connected to a trigger circuit which is reversed by every trailing edge. The trailing edge from this first trigger circuit is connected to reverse another trigger circuit. Similar trigger circuits activated in a comparable manner are provided to thereby define time spaces of different durations. The output of the trigger circuits are connected to circuits which respond in the conventional Boolean logic of AND, OR, EXCLUSIVE OR, and similar functions.

It is realized, of course, that the above description basically outlines an entirely conventional form of clocking and logical implementation in electronic data processing. Applicant merely wishes to emphasize that his preferred device carries such implementation to its complete efficiency. Thus, every major function of the machine is under the control of circuits which contain logical inputs, many of them representative of clock times. Depression of the "Multiply" key or the "Divide" key picks an electrical latch which remains up to produce signals having the significance of Multiply, Divide, Not Multiply, and similar operation functions as the case may be, which signals connect as inputs to various logical circuits.

One example of this almost complete reliance upon logic modules appears in the drawings. Thus, a signal which traces rather directly to the oscillator will be Up to give a Point Search indication to one leg of counter 62 during the search through the memories for the decimal point. Another signal, which also traces rather directly to the oscillator, is Up at the time of every fifth memory bit position to indicate Point Time (or simply that the clocking has progressed to a position at which a decimal point bit store is being read). These two signals are ANDed with the No Point signal, which is, of course, read from the actual bit location being read from memory and with the Not Latched signal, which is, as described, a signal created and continued after a point is found.

Applicant believes that the new device herein described is a significant advance especially in the manner of processing of decimal point. Added structure such as the decimal point bit location in each stage of the registers is provided, but the over-all efficiency is nonetheless good. It is particularly important that the machine operator must make only minimal reference to the decimal point when the machine is built in accordance with this invention.

While the invention has been particularly shown and described with reference to a preferred embodiment thereof, it will be understood by those skilled in the art that the foregoing and other changes in form and details may be made therein without departing from the spirit and scope of the invention.

I claim:

1. An electronic data processing machine comprising:

a result register having a plurality of relatively ordered positions to store machine conditions representative of a fractional point in at least a selected one of said plurality of relatively ordered positions and to store machine conditions representative of a number in at least one of said plurality of ordered positions, the relative positional relationship of the ordered positions containing the number representation to the at least one ordered position containing the fractional point representation representing the position of the fractional point relative to the number, storage means to store machine conditions representative of two numbers and of the fractional point location of the two numbers, computing means responsive to machine conditions designating an arithmetic operation to access said storage means and to compute the fractional point location of the result of one arithmetic operation from the group of arithmetic operations consisting of addition, subtraction, multiplication, and division upon said two numbers, arithmetic means to perform said one arithmetic operation on said two numbers and to insert the resultant number in said result register, means responsive to said computing means to select one of said plurality of ordered positions of said result register and to store machine conditions representative of a fractional point in said position in proper relation to the resultant number stored; and display means to read said result register in accordance with a preselected pattern and to display in a visually readable form the resultant number including the fractional point.

2. An electronic data processing machine as defined in claim 1 wherein said storage means includes said result register so that one of said two numbers and its corresponding fractional point representation is originally stored in said result register.

3. An electronic data processing machine as defined in claim 2 wherein said one arithmetic operation is addition or subtraction, said storage means includes a second register having a plurality of relatively ordered positions to store machine conditions representative of a fractional point in at least a selected one of said plurality of relatively ordered positions and to store machine conditions representative of a number in at least one of said plurality of ordered positions, said computing means is operative by shifting at least one of said two numbers and its corresponding fractional point through the ordered positions of its corresponding register until both numbers have their fractional point representation in correponding ordered positions.

4. The electronic data processing machine as defined in claim 1 specifically comprising as part of said computing means, means to access said storage means to compute the sum of the numerical orders below the fractional points of the numbers when said one arithmetic operation is multiplication and to compute the difference of the numerical orders below the fractional point of the numbers when said one arithmetic operation is division.

5. The electronic data processing machine as defined in claim 4 wherein said storage means includes said result register so that one of said two numbers and its corresponding fractional point is originally stored in said result register.

6. The electronic data processing machine as defined in claim 1 wherein said result register and said storage means comprise binary magnetic and electronic storage elements connected to be accessed in a predetermined order for any of the arithmetic operations of addition, subtraction, multiplication, and division.

7. The combination as in claim 6 wherein said storage means includes said result register so that one of said two numbers and its corresponding fractional point is originally stored in said result register.

8. The electronic data processing machine as in claim 6 specifically comprising as part of said computing means, means to access said storage means to compute the sum of the numerical orders below the fractional points of the numbers when said one arithmetic operation is multiplication and to compute the difference of the numerical orders below the fractional points of the numbers when said one arithmetic operation is division.

9. The electronic data processing machine as in claim 8 wherein said storage means includes said result register so that one of said two numbers and its corresponding fractional point is originally stored in said result register.

10. The electronic data processing machine as in claim 9 wherein said one arithmetic operation is addition or subtraction, said storage means includes a second register having a plurality of relatively ordered positions to store machine conditions representative of a fractional point in at least a selected one of said plurality of relatively ordered positions and to store machine conditions representative of a number in at least one of said plurality of ordered positions, said computing means is operative by shifting at least one of said two numbers and its corresponding fractional point through the ordered positions of its corresponding register until both numbers have their fractional point representation in corresponding ordered positions.

11. The electronic data processing machine as in claim 1 wherein both said numbers are stored and processed in binary coded decimal form and wherein said display is in decimal form and wherein said fractional point is, therefore, a decimal point.

12. The electronic data processing machine as in claim 3 wherein both said numbers are stored and processed in binary coded decimal form and wherein said display is in decimal form and wherein said fractional point is, therefore, a decimal point.

13. The combination as in claim 10 wherein both said numbers are stored and processed in binary coded decimal form and wherein said display is in decimal form and wherein said fractional point is, therefore, a decimal point.

14. The combination as in claim 1 wherein said machine includes keyboard means to key in said numbers and said machine automatically stores an indication representative of a fractional point at the end of a number keyed in when no fractional point is keyed in at the keyboard.

15. The apparatus as in claim 1 wherein said arithmetic operation is division, the number of orders of the resultant number stored in said result register below the order of the fractional point representation corresponding to the number of orders below the fractional point of the one of said two numbers representing the dividend in the arithmetic operation.

References Cited

UNITED STATES PATENTS

| | | | |
|---|---|---|---|
| 2,702,159 | 2/1955 | Reppert | 235—63 |
| 2,769,592 | 11/1956 | Burkhart et al. | 235—159 |
| 2,935,250 | 5/1960 | Reppert | 235—60.12 |
| 2,947,478 | 8/1960 | Lentz et al. | 235—160 |
| 2,951,637 | 9/1960 | Lind | 235—159 |
| 3,043,509 | 7/1962 | Brown et al. | 235—156 |
| 3,056,550 | 10/1962 | Horrell | 235—164 |
| 3,074,635 | 1/1963 | Borne et al. | 235—156 |
| 3,315,069 | 4/1967 | Böhm | 235—164 |

PAUL J. HENON, *Primary Examiner.*

ROBERT C. BAILEY, *Examiner.*

R. B. ZACHE, *Assistant Examiner.*